Figure 1:
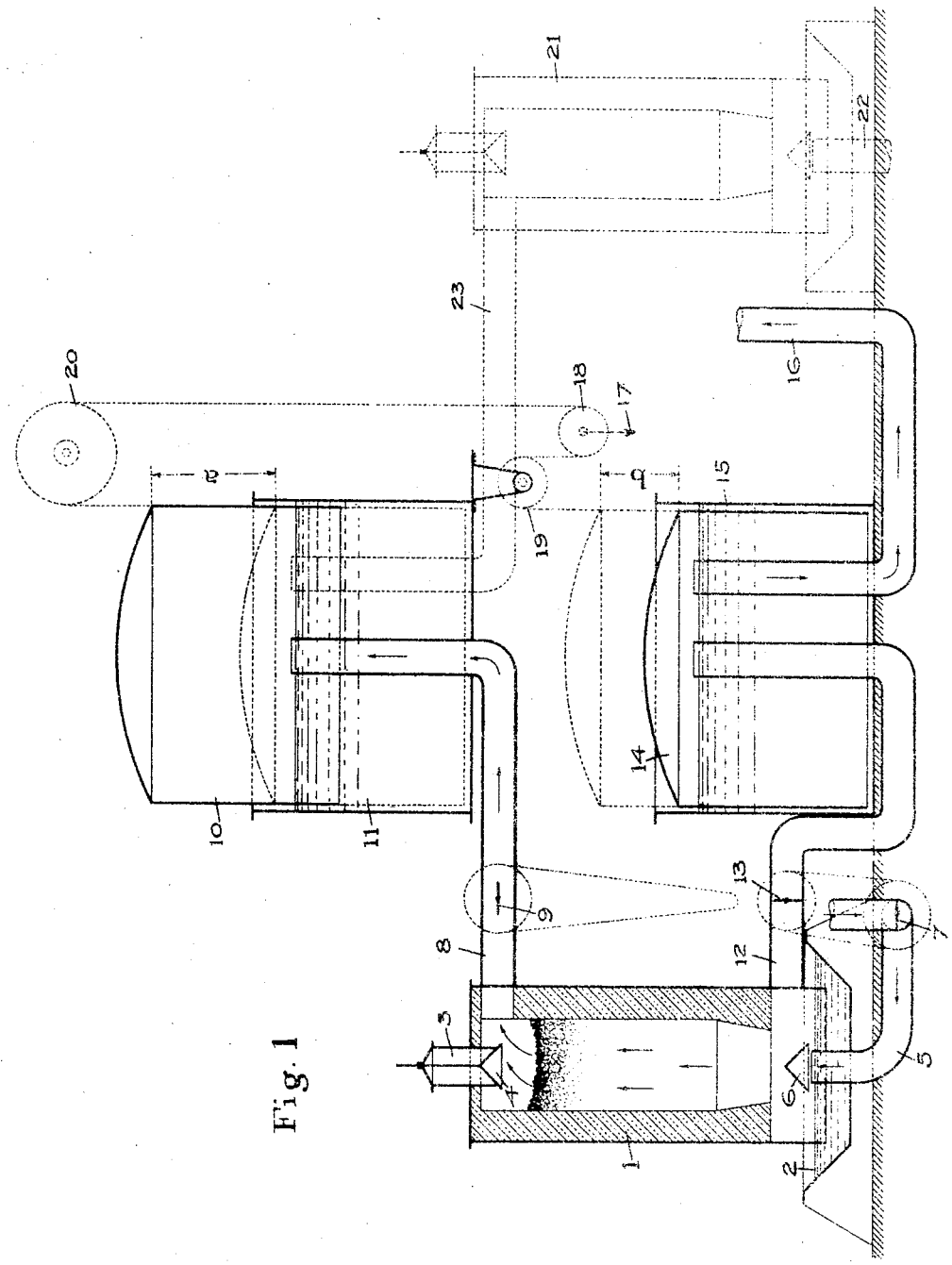

No. 779,776. PATENTED JAN. 10, 1905.
P. EYERMANN.
APPARATUS FOR MANUFACTURING GAS.
APPLICATION FILED DEC. 30, 1903.

2 SHEETS—SHEET 1.

WITNESSES.

INVENTOR.
Peter Eyermann
by J. R. Wemlinger
his ATTORNEY.

No. 779,776. PATENTED JAN. 10, 1905.
P. EYERMANN.
APPARATUS FOR MANUFACTURING GAS.
APPLICATION FILED DEC. 30, 1903.

2 SHEETS—SHEET 2.

WITNESSES,
H. F. Wemlinger.
N. F. Allen.

INVENTOR.
Peter Eyermann
by J. P. Wemlinger
his ATTORNEY.

No. 779,776. Patented January 10, 1905.

UNITED STATES PATENT OFFICE.

PETER EYERMANN, OF BELOIT, WISCONSIN, ASSIGNOR OF ONE-HALF TO JULIUS R. WEMLINGER, BOROUGH OF WESTMONT, PENNSYLVANIA.

APPARATUS FOR MANUFACTURING GAS.

SPECIFICATION forming part of Letters Patent No. 779,776, dated January 10, 1905.

Application filed December 30, 1903. Serial No. 187,159.

*To all whom it may concern:*

Be it known that I, PETER EYERMANN, a subject of the Emperor of Austria-Hungary, residing at Beloit, in the county of Rock and State of Wisconsin, have invented a new and useful Apparatus for Manufacturing and Improving Gas, of which the following is a specification.

My invention relates to apparatus whereby both the physical and chemical properties of blast-furnace gas, producer-gas, water-gas, or gas such as manufactured in the Mond, Loomis, and like producers, or retort-gas are improved for the purpose of enhancing their value for industrial uses; and its objects are to provide improved gas generators or producers, receivers, valves, and other appliances which shall coöperate to manufacture a gas of high calorific value, clean, free from dust, moisture, soot, or tarry matters, and especially suitable for use in internal-combustion engines, but equally well adapted for other gas-consuming appliances.

Blast-furnace gas, producer-gas, and other manufactured gases above referred to always contain a sensible quantity of carbon dioxid ($CO_2$) and more or less steam or moisture derived from various sources. These constituents are inert and incombustible and only serve to diminish the calorific value of the gas; but by proper treatment they can both be converted into highly calorific and combustible constituents. Furthermore, blast-furnace gas carries a large quantity of mineral dust and producer-gas is seldom free from either tar or soot, all of which is very objectionable when either gas or a mixture of the two is used in gas-engines. It is very desirable to increase the calorific value of a combustible gas, because gas-engines, furnaces, and other gas-consuming appliances will require less gas in proportion that the latter is rich in combustible substances. The presence of mineral dust is very detrimental to gas-engines not only on account of the wear on the sliding surfaces, but also on account of interference with all valve adjustments and seats giving rise to leakages and back explosions. If the igniter is covered with dust or soot, this is pretty sure to cause other failures to ignite subsequent admissions. Furthermore, the presence of tarry or soot-producing components is highly objectionable on account of the dangers of premature ignition.

The objects of this invention are attained by means of the apparatus illustrated in the drawings annexed hereto, which form part of this specification, and in which like characters of reference designate like parts.

Figure 2:
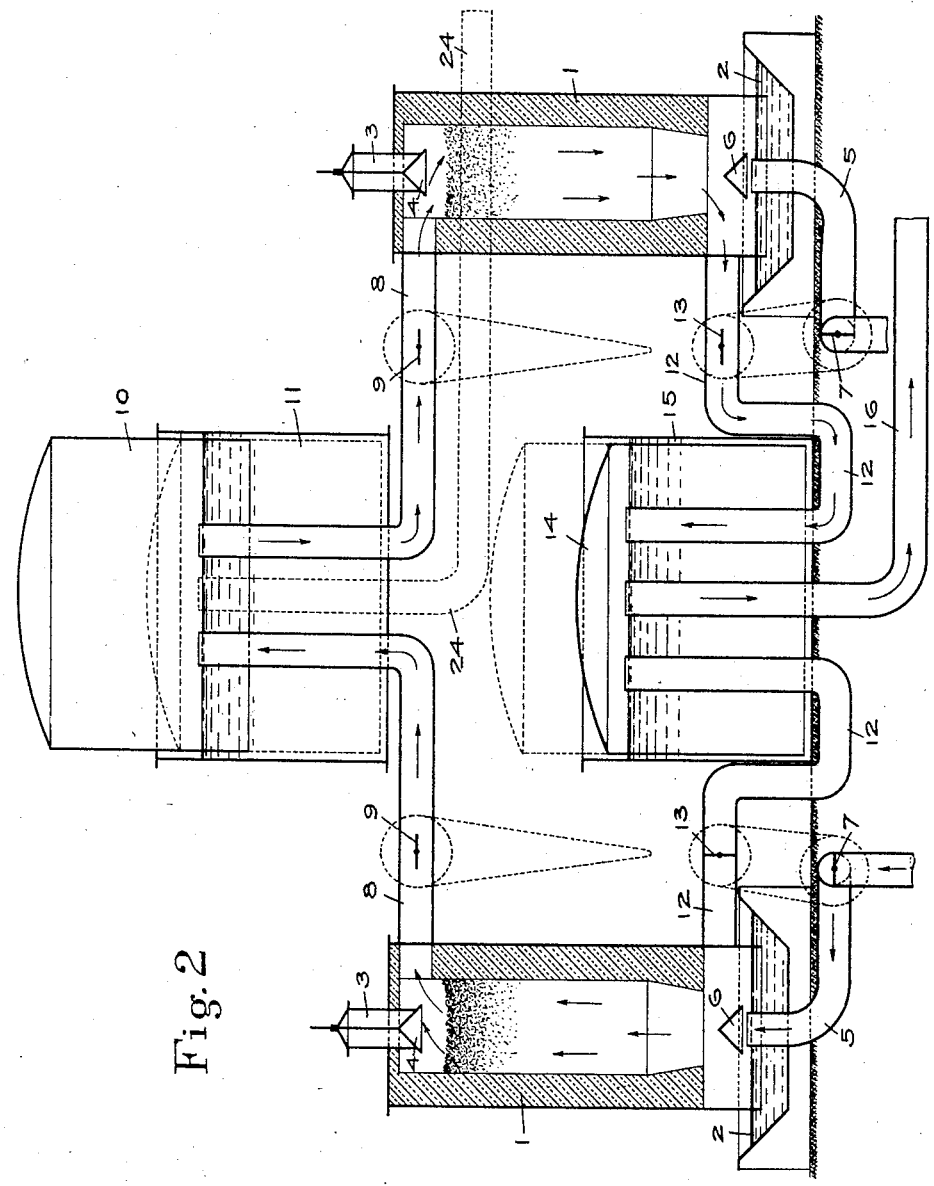

Figure 1 is a vertical sectional elevation of an apparatus for manufacturing and improving gas consisting of one or two gas generators or producers arranged in combination with gas holders or tanks. Fig. 2 is a vertical sectional elevation of a modification of the apparatus shown in Fig. 1, whereby the operation of the generators may be made reversible and continuous.

Referring to Fig. 1, a gas generator or producer 1 is shown provided with a water seal 2 and a charging device or hopper 3 for introducing coal, coke, or any other carbon-containing material. This charging device may be closed by a bell 4 or any other contrivance which will efficiently prevent either the entrance of air or escape of gas. The fuel is charged in the generator 1 up to approximately the height shown, and the ashes are extracted below in the usual manner. Poking-holes may be provided in the sides and in the top of the gas-generator 1, or a mechanical poking device may be introduced. The air is introduced with the required pressure through a pipe 5, provided with a cone 6, which prevents the fall of ashes within the pipe and serves to distribute the air uniformly. It will be noted that this preliminary description is very general, and my invention is not to be limited to the particular type of generator or producer and appliances shown and described, as these may be varied to suit the fuel used and the particular conditions to be satisfied. The fuel having been previously ignited at the bottom of the generator 1, air is blown in through the pipe 5, the quantity and pressure thereof being regulated by means of a valve 7, which also serves to shut off the supply of air when desired. Combustion now takes place, and gas commonly known as "producer-gas" is generated. This escapes through a flue or pipe 8, provided with a valve 9, thence flows and collects in a tank or reservoir 10, placed within a water seal 11, after the well-known system of illuminating-gas tanks. The gas-tank 10 may be placed above, as shown, or it may be located on or below the general level, as found most convenient. After a certain period of blowing the fuel within the generator 1 becomes incandescent, the duration of this period depending upon the quality of the fuel, the pressure of the air-blast, the amount of moisture in the air, and the dimension of the generator. As soon as the fuel at the top begins to show incandescence the operation is stopped by closing the air-valve 7, and further generation of gas is thus prevented. The gas which is now collected in tank 10 is under a certain pressure resulting from the superincumbent weight of the tank. Hence it will seek its only escape, which is downward, through the generator 1, and in order to provide an exit therefor the generator 1 is provided at the bottom with a pipe 12, which has a valve 13 and leads to another tank or receiver 14, placed in a water seal 15. As indicated, the gas-valve 13 may be connected with the air-valve 7 by means of a chain or rope, so that simultaneously with the closing of the air-valve 7 the gas-valve 13 is opened, and vice versa. The gas-valve 9 is also arranged with a chain or flexible connection, by which it may be conveniently manipulated. In the downward descent of the gas through the incandescent fuel the soot is consumed, and the tar is broken up into valuable constituents, mostly carbon and hydrogen. At the same time all the particles of dust will be deposited in the upper beds of the fuel, which thus operate like a scrubber. Furthermore, the improved gas, through the well-known reaction of carbon dioxid ($CO_2$) in presence of incandescent carbon, has changed its original quantity of inert and valueless carbon dioxid into double the quantity of combustible carbon monoxid, (CO.) All the moisture or steam which is present is decomposed into hydrogen and carbon monoxid by the reaction of the incandescent fuel and furnishes a further enrichment of the improved gas, which is now clean, free from dust, moisture, soot, and tarry matters, while the calorific power thereof is increased to a dgreee. As hereinbefore stated, the improved gas flows to a receiver or tank 14, where it collects and whence it is distributed through a pipe 16 to the engine, furnace, or whatever appliance is to be supplied therewith. This gas, coming, as it does, directly from the hottest zone of the gas-generator, will have a very high temperature—a feature which is desirable if the gas is to be used directly in a furnace, but is very undesirable when it is to be used in internal-combustion engines. Hence a suitable cooling device (not shown) is preferably inserted between the generator 1 and the tank 14, or the sensible heat of the gas can be used in a variety of ways which will readily suggest themselves to those familiar with the art. As soon as the gas-tank is exhausted the gas-valves 9 and 13 are closed, fresh fuel charged in the generator, and the air-valve 7 and the gas-valve 13 opened, after which the operation goes on as before. It is known from experience that the generation of a certain quantity of gas called "warm blow" requires a much longer period of time than the production of the same quantity of improved gas, (called "cold blow.") Therefore it is advisable to make the valve 9 adjustable or preferably to provide a certain proportion in the lifts $a$ and $b$ of the gas-tanks 10 and 14 in order to obtain a regular consumption of the improved gas, and this may be obtained by connecting the two said tanks by means of ropes or chains with a counterweight 17, carried by a movable pulley 18, while the chains or ropes pass over stationary pulleys 19 and 20. Thus when one gas-holder goes up the other goes down, and vice versa, and a certain relation can always be made to exist between the motion of the tanks, according to the quantity of gas which it is desired to collect in each and to distribute. It is obvious that the same relation can be preserved whatever may be the respective position of the tanks. If for some reason it is desired to equalize the periods of warm blow and cold blow and where a larger quantity of gas is needed than can be furnished by one generator, another generator 21 (shown in dotted lines) may be combined with the apparatus above described. (Shown in full lines.) Then the period of cold blow can be made of the same duration as that of warm blow, because double the quantity of gas will now be available for treatment. The generator 21 may be constructed as an ordinary gas-producer with an air or blast pipe 22 and a pipe or flue 23, which leads the gas into tank 10, where it mixes with the gas coming from generator 1, or both generators may be built alike in all respects in order to secure the advantages of a reversible system. If the generator 21 is constructed as shown in Fig. 1, its only function is to generate gas continuously or intermittently, and this gas is treated in generator 1 as above described. If both generators are built alike, their operation is similar and alternate, as described hereinafter and illustrated in Fig. 2. It may be noted here that the flue 12 is not necessarily connected to the generator 1 at the exact point shown, but can be arranged so as to lead off from any other point in the neighborhood of the hottest zone of the generator. It should also be noted that the gas-tanks 10 and 14 can be built as dry receivers or can be arranged to operate independently of each other, provided the pressure on the consuming side is constant.

Although my system of improving gas resembles the well-known Loomis system in some respects, it is essentially different therefrom in operation. I provide for the admission of the air or blast below the fuel, and the combustion is upward, as in the old type of producer, whereas in the Loomis producer the air is admitted above the fuel and combustion takes place downward. Thus my system presents an additional advantage in the fact that inasmuch as no air passes down through the fire-bed there can be no ash formed on top of the fire, but the ash and clinker will be at the bottom and may be removed in the usual manner. Furthermore, the gas which results from my treatment is practically free from carbon dioxid, ($CO_2$,) whereas this is always present in varying proportions in the Loomis gas or any other producer-gas manufactured at the present time.

Instead of two generators a greater number can be combined with two or more tanks or receivers in a large plant, and in such a case furnaces can be supplied with producer-gas from the tank 10, while the engines can be supplied with improved gas from the tank 14. My apparatus can also be used in connection with an existing plant of ordinary producers, in which case it is only necessary to connect the gas-tank 10 with the gas-main of the producer plant and the improved gas produced therefrom is stored in tank 14, as before, or in place of producer-gas the gas from any other plant or system can be treated in the same manner. As a matter of fact one of the most important advantages of my apparatus is its adaptability to be used in connection with any supply of gas, whether poor or rich, and improve the gas treated. Whatever be the gas treated, it is preferably introduced in the tank 10, mixed therein with the producer-gas from one or more generators, and this mixture is subsequently improved and enriched by its downward passage through either generator, provided, of course, both generators are arranged with the necessary connections. The gas to be treated can be conveniently introduced into the tank 10 through a pipe or flue which may be connected to the pipe 23 or through a separate flue 24, as shown in Fig. 2.

Referring now to Fig. 2, two gas-generators are shown arranged for the production and improvement of gas on the continuous and reversible system. In this case both generators are exact duplicates in detail, and as all the parts illustrated have been described in connection with Fig. 1 no further description thereof is necessary, except to explain the operation of the apparatus. Assuming the various valves in the position shown in the figure and following the direction of the arrows, the gas produced in the left-hand generator passes through or collects in the tank or holder 10. It is then passed through the fuel in the right-hand generator, which has been brought to incandescence by a previous operation, thence into the tank or holder 14, from which it is distributed to the engine or other apparatus to be supplied with the gas through the pipe 16. After the completion of the period of warm blow the operation is reversed by closing the air-valve 7 and opening the gas-valve 13 of the left-hand generator, at the same time opening the air-valve 7 and closing the gas-valve 13 of the right-hand generator, after which the gas will travel in the direction opposite to that of the arrows and reach the tank 14 through the left-hand pipe 12. At the beginning of the operation the gas produced in the generator started first may of course be collected and held in the tank 10 until, after the completion of the period of blowing up of the first generator, the other generator is in turn started, when the gas then in tank 10 can be passed downward through the first generator, together with the gas now produced in the second generator. Afterward the operation becomes continuous, and if it is desired to increase the amount of gas treated the gas from any other source enumerated at the beginning of this specification can be admitted into tank 10 through pipe 24, as above described. Other combinations and arrangements of the apparatus shown in Fig. 2, such as placing two generators one above each other or three generators in line, or modifications thereof, will readily suggest themselves and can be used in cases where a particular installation is required without departing from the principles of this invention. Furthermore, scrubbers, washers, carbureters, or other appliances, such as exhausters, may be introduced in the system, if necessary.

The apparatus herein described provide means whereby the heat stored in the fuel by the blowing up or warm blow is utilized to improve the gas produced thereby or any other combustible gas by passing the same through the incandescent fuel. The gas thus manufactured and herein referred to as "improved" gas is, with the exception of whatever percentage of nitrogen is present in the original gas, all combustible and in addition possesses other qualifications enumerated herein. It should be noted once for all that any and all kinds of fuel can be used, from the best grades of coke and anthracite down to the lowest grades of lignite, and even waste boiler-fire slack, so long as the necessary heat can be generated in the fuel. Furthermore, the generators can be worked on "dry fan" air or "wet steam-jet" air with equal facility. Thus my system possesses an elasticity of operation not equaled by any other system.

A very important feature of my system of manufacturing and improving gas is that by making the period of cold blow of sufficient duration I can accomplish the complete dissociation of the carbon dioxid ($CO_2$) in the gas treated into the carbon monoxid, (CO,) while, as stated hereinbefore, the tarry vapors and the moisture are decomposed into hydrogen and carbon monoxid. These reactions are further assisted and enhanced by the thick bed of incandescent fuel which is available after the period of warm blow or generation of gas. Another important feature is that by using a high pressure of air I can produce a similar high pressure of gas in the holder, which is efficient in forcing the gas back into and through the generator without the assistance of exhausters or blowers. Thus by means of simple and comparatively cheap apparatus I can manufacture a larger quantity of gas of greater calorific value per unit weight of coal than could be obtained heretofore for the amount of money invested.

Although I have shown my improved apparatus in some detail, I would have it understood that this invention is subject to many changes and modifications, which can be introduced by those familiar with the art with the expected skill of the calling. Such substitutions, modifications, or equivalents thereof are to be considered within the scope of my invention.

It should be noted that this application, although it includes a description of the process or method used, is not intended to cover any step therein, but is limited to the apparatus adapted to the process, and it is intended to cover the latter in a separate application.

What I claim, and desire to secure by Letters Patent, is—

1. In apparatus for manufacturing or improving gas, the combination of a gas-generator with gas-holders having interdependent motions or lifts and separate connections with said generator.

2. In apparatus for manufacturing gas, the combination of two separate gas-holders, with a gas-generator provided at the top with a pipe leading to one of said gas-holders and, at the bottom with two pipes or flues, one of which leads to the other gas-holder, both said pipes or flues being controlled by a connected system of valves whereby one pipe or flue is always shut while the other is open.

3. In apparatus for manufacturing gas, the combination of a gas-holder and gas-generators connected thereto, with a separate gas-holder connected with one of said generators.

4. In apparatus for manufacturing and improving gas, a gas-generator, an air-pipe at the bottom thereof, a gas-pipe at or near the top of the fuel-chamber for the escape of the gas generated therein, means for forcing the same gas back into the generator through the same pipe, and means for drawing off the resulting improved gas from the bottom of the said generator.

5. In apparatus for manufacturing and improving gas, a gas-generator having an air-pipe located at the bottom thereof, a gas-pipe at or near the top of the fuel-chamber for the escape of the gas generated therein, a gas holder or receiver for collecting the said gas and for forcing the same back into the generator after the air-pressure is removed from the bottom thereof, a pipe at or near the bottom of the fuel-chamber for drawing off the resulting improved gas, another gas holder or receiver for collecting the said improved gas, and means for supplying the improved gas under constant pressure.

6. In apparatus for manufacturing and improving gas, a gas-generator, means for charging fuel therein, a pipe or flue at the bottom of the generator for blowing in air and thereby heating the body of fuel to incandescence, a pipe at the top of the generator for the escape of the gas thus produced, means for collecting the said gas and forcing the same back into the said generator through said pipe after the period of gas generation is terminated thus decomposing its carbon dioxid into carbon monoxid and its tarry vapors and moisture into fixed gases, and means for drawing off and collecting the resultant mixture of gases.

7. In apparatus for manufacturing and improving gas, two gas-generators, a gas-holder connected thereto, both generators being constructed to deliver gas from their tops into said gas-holder, a separate gas-holder, one of said generators being constructed to deliver improved gas from its bottom into said separate gas-holder.

8. In apparatus for manufacturing and improving gas, gas-generators and gas-holders connected thereto, said generators being constructed to deliver producer-gas from their tops into one of said holders and being also constructed to deliver improved gas from their bottoms into another of said gas-holders, said improved gas resulting from the downward passage of the said producer-gas through the incandescent fuel in the gas-generators aforesaid.

9. In apparatus for manufacturing gas, a gas-generator, a gas-holder, a pipe leading from said generator into said holder, a separate pipe leading into said holder for admitting gas therein from some other source than the said gas-generator, means whereby the gas collected in the said holder can be forced downward through the said generator, and means for drawing off the resulting improved gas.

10. In apparatus for manufacturing gas, two gas-generators, a gas-holder connected thereto at the top and constructed to collect the gas produced in either of said generators, means whereby the gas collected therein can be delivered to the other generator, and a separate gas-holder connected with the bottoms of the generators aforesaid.

11. In apparatus for manufacturing gas, gas-generators, a gas-holder connected thereto, means whereby gas from some other source than said generators may be admitted into said holder and mixed with the gas produced in the said generators, means whereby the gas mixture can be passed downward through one of said generators, and means for drawing off the resulting improved gas.

In testimony whereof I have signed my name to this specification in the presence of two witnesses.

PETER EYERMANN.

Witnesses:
T. W. COMSTOCK,
H. SUSSER.